May 7, 1946.  C. E. DEARDORFF  2,399,665
CREAM SEPARATOR
Filed Jan. 25, 1943
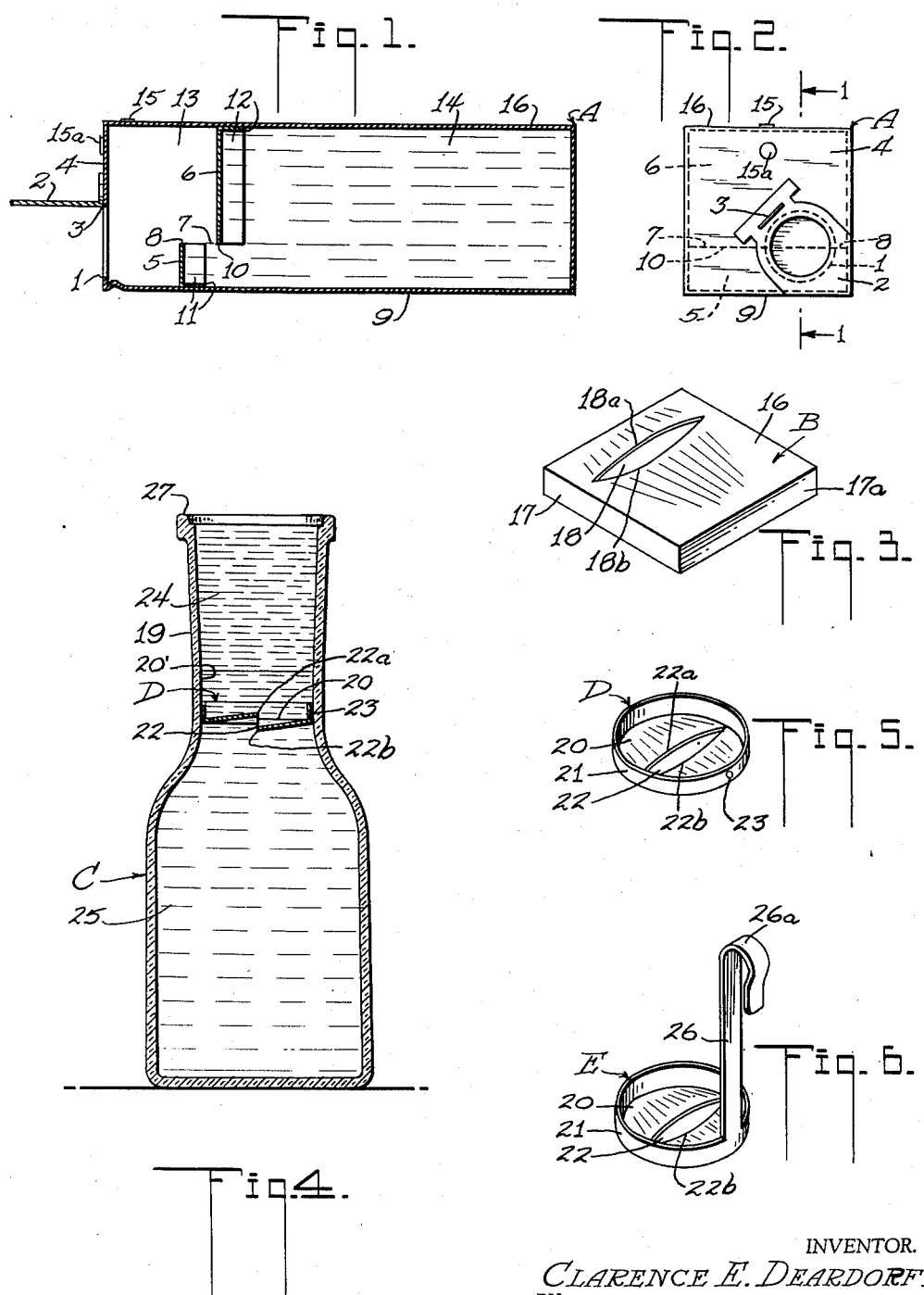
INVENTOR.
CLARENCE E. DEARDORFF
BY
Munn, Liddy & Glaccum
ATTORNEYS Patented May 7, 1946

2,399,665

UNITED STATES PATENT OFFICE 2,399,665

REISSUED

CREAM SEPARATOR

Clarence E. Deardorff, Sacramento, Calif.

APR 4 1950

Application January 25, 1943, Serial No. 473,564

12 Claims. (Cl. 210—51.5)

The present invention relates to improvements in a cream separator and it consists of the combinations, constructions and arrangements hereinafter described and claimed.

An object of my invention is to provide a cream separator which may be placed in milk bottles or cartons that hold whole milk. The separator consists of but one part and it does not interfere with the cream rising to the top of the container while the whole milk is standing. The separator coacts with the bottle to form a milk compartment and makes use of a physical law to create a vacuum in the milk compartment to prevent the skim milk from being poured from the container while the cream is poured therefrom. The container must be maintained in a particular position during the pouring of cream. It is possible to pour all of the cream from the container without pouring any of the milk, or, if desired, a mixture of cream and milk can be poured at any time during the pouring by merely rocking the container about its longitudinal axis through an arc not exceeding 90°, thereby feeding air into the milk compartment for releasing the vacuum.

The device does not make use of any moving parts such as flap valves and the like and it may be used for separating other liquids of different densities where the less dense liquid rises to the top of the container. It is possible to make the device a permanent part of the container as when it is used in a milk carton or a removable part as when it is used in a milk bottle. It is also possible to use the device in a standard milk carton or milk bottle and by means of a handle insert it in a milk bottle in which the cream has already separated itself from the skim milk. The only point to keep in mind when using the device is to hold the container in a certain position during the pouring operation.

Other objects and advantages will appear in the following specification, and the novel features of the device will be particularly pointed out in the appended claims.

My invention is illustrated in the accompanying drawing forming a part of this application, in which:

Figure 1 is the longitudinal section taken along the line 1—1 of Figure 2 and shows the milk carton with one form of my device operatively applied thereto;

Figure 2 is a front elevation of a carton;

Figure 3 is an isometric view of the device shown in a slightly modified form;

Figure 4 is a vertical section through a bottle showing my invention placed at the cream line;

Figure 5 is an isometric view of the cream separator used in the milk bottle; and Figure 6 is a cream separator supported by a handle.

While I have shown only the preferred form of my invention, it should be understood that various changes or modifications may be made within the scope of the appended claims without departing from the spirit of the invention.

In carrying out my invention I make use of a milk carton indicated generally at A in Figures 1 and 2. The carton may be of any shape desired and made from any material that will hold a liquid. I do not wish to be confined to a milk carton because, as already stated, the device may be used to separate liquids of different densities. The carton A has an opening 1 through which the fluid may be poured, and a cap 2 normally closes the opening. The cap is hinged at 3 to the container top 4. It will be noted that the opening 1 is placed near one corner of the carton.

The form of my invention shown in Figures 1 and 2 consists of two transversely disposed partition members 5 and 6 that are longitudinally spaced from each other to provide an aperture or slot 7 which, as shown, extends across the width of the carton. The partition 5 is shown as of less area than the partition 6 and the edge 8 of this partition is placed near the side 9 of the carton. The partition 6 has its edge 10 lying substantially in the same longitudinal plane as the edge 8, the plane extending parallel to the side 9. The partition members 5 and 6 may be secured to the walls of the carton by any means desired. I have shown the partition 5 provided with flanges 11 and the partition 6 with flanges 12. These flanges are secured to the carton walls by any desired fastening means. The edge 8 is nearer the carton top than the edge 10. The two partition members function as a single partition having an upwardly opening aperture or slot 7 the edges of which lie in substantially a common plane extending at right angles to the general plane of the partition.

It will be observed that the partition members 5 and 6 arranged as shown in Figure 1 define an opening 7 which affords free communication between a cream chamber 13 and a skim milk chamber 14 of the carton, which opening is ample in cross sectional area to permit rapid filling of the container when upright and which due to the disposition of the edges 8 and 9 of the partition members one in front of the other as described, a body of liquid is trapped behind the partition member 5 when the carton is placed in the horizontal pouring position shown in Figure 1, which body of liquid effectively seals the edge 10 against passage of air into the skim milk space 14 of the container and thus prevents discharge of skim milk from behind said partition so long as the container is maintained in this position.

The partition 6 is placed at the cream line for the milk. In other words when the container is filled with milk and in its upright position, the cream which rises to the top will fill the cream space 13 down to the partition 6 and the skim milk will fill the milk space 14. An important feature of the invention is the provision of a mark or indicator 15 which is placed on the side 16 of the carton in predetermined relation to the opening 7 and this mark informs the person that if only the cream is to be poured from the carton, the side of the carton with the mark must be kept uppermost. In other words it is necessary that the upwardly opening slot 7 be in a substantially horizontal position during the pouring if cream only is desired and that the edge 8 which is nearest the top of the container face upwardly as shown. It is possible to place the mark 15 at the point 15a on the top 4 of the carton rather than on the side 16 if desired. The person must keep the mark 15a at the top of the carton during the pouring operation in order that the slot 7 will remain in a horizontal position and that the edge 8 will remain at the lower half of the carton.

From the foregoing description of the various parts of the device, the operation thereof may be readily understood.

In Figure 1 I show the carton in pouring position with the slot 7 opening upwardly with the edges 8 and 10 of the slot lying in a substantially horizontal plane and the cream compartment 13 empty. The cover 2 has been opened and the cream poured from the opening 1 until the compartment 13 is empty. The reason that only cream will be poured and no skim milk is that a vacuum is created in the compartment 14 during the pouring operation and air is effectively sealed against ingress into said space 14 under the edge 10 of the partition member 6 by the body of liquid trapped behind the partition member 5. This vacuum is sufficient to hold all of the skim milk in the compartment so long as the slot 7 is kept in a substantially horizontal plane. In this simple way the cream may be separated from the milk. Any amount of the skim milk can be subsequently dispensed by merely rocking the container about its longitudinal axis for swinging the slot 7 toward a vertical position. The upper end of the slot 7 will permit air to enter the compartment 14 and relieve the vacuum. To the extent that the vacuum is relieved, the skim milk will pour from the space 14 through the slot 7 and out through the opening 1. In this way the pouring of the milk can be stopped at any time by merely rocking the container to swing the slot back into a horizontal position. It is not necessary to return the container to an upright position. A mere rocking of the container about its longitudinal axis prior to the complete removal of the cream from the space 13 will cause the skim milk to pass through the slot 7 and mix with the cream. By this procedure a mixture of milk and cream can be delivered during the pouring operation and this mixture can be of any proportion desired.

In Figure 3 the cream separator indicated at B is in one piece rather than in two partitions 5 and 6. The separator B comprises a partition 16 that extends across the carton A and has flanges 17 by means of which it is permanently secured to the carton. The partition 16 has a slot 18 therein with one edge 18a curved upwardly and the adjacent edge 18b curved downwardly respectively above and below the general plane of the partition member. The edge 18a takes the place of the edge 8 of the partition 5 and the edge 18b takes the place of the edge 10 of the partition 6. Care should be taken that when the cream separator B is placed in the carton, the flange 17a be placed adjacent to the carton side 16 that carries the mark 15. This will dispose the edge 18a, which is nearest the carton top, at the lower half of the container.

The operation of this form of the device is identical to the form already described. The slot 18 while maintained in an upwardly opening, substantially horizontal position during the pouring operation by keeping the carton side 16 and mark 15 uppermost will create a vacuum in the milk compartment and will permit the cream to be discharged from the cream space while retaining the skim milk in the milk space due to the sealing of the edge 18b by the milk trapped behind that part of the partition terminating in the edge 18a. A rocking of the carton about its longitudinal axis will cause the slot 18 to swing toward a vertical position and thus permit air to enter and relieve the vacuum in the space 14 and permit the skim milk to be poured.

In Figure 4 I show my device applied to a milk bottle indicated generally at C. The neck 19 of the bottle has a straight portion 20' that frictionally receives and supports my cream separator D. The separator is shown in Figure 5 and it has a circular partition or disc 20 and a circular flange 21 extending from one face of the disc. A slot 22 extends diametrically across the partition 20 and has its edge 22a curved inwardly into the space defined by the flange 21 and its edge 22b curved outwardly. A marker 23 is placed on the flange 21 at a point equidistance circumferentially from the ends of the slot and in position to be above the upwardly opening slot 18 when the bottle is in pouring position.

The cream separator D is placed in the bottle and is frictionally held in place by the flange 21 engaging with the wall 20'. The bottle may now be filled with whole milk and the milk will pass through the slot 22 and into the bottom of the bottle. The slot 22 permits the cream to rise and the cream 24 will fill the top of the bottle while the skim milk 25 will fill the bottom. Figure 4 illustrates the bottle cap removed and the bottle ready to pour. The mark 23 can be seen through the glass bottle and the portion of the bottle showing this mark is kept on top during the pouring operation. This will cause the slot 22 to remain in a horizontal plane during the tilting of the bottle and will keep the edge 22b of the slot sealed in the body of milk trapped behind the edge 22a that is nearest the bottle top while the bottle is in a tilted position. The cream can be poured off and the vacuum created in the bottom of the bottle will hold the skim milk in the bottle. The skim milk can be poured while the cream is being poured or subsequently thereto by merely rocking the bottle on its longitudinal axis for swinging the slot 22 toward a vertical position when milk is desired. The device functions in exactly the same manner as when used in the carton.

In Figure 6 I show another cream separator indicated generally at E. This separator is identical to that shown in Figure 5 except that it has a handle 26 extending upwardly from the flange 21. Like parts will therefore be given similar reference numerals. The handle 26 is rigidly secured to the flange 21 at a point on the flange which corresponds to the position occupied by marker 23 on the separator D. When using this device, the separator E can be moved slowly through the cream 24 without disturbing it because the cream will flow through the slot 22. When the top 26a of the handle reaches the rim 27 of the bottle, the cream separator E will be at the required position, i. e. at the cream line. The bottle can now be tilted for removing the cream, care being taken that the handle 26 remains at the portion of the bottle which will be on the upper side of the bottle during the pouring operation. This will maintain the slot 22 in a horizontal position. Only the cream will be removed because the vacuum created in back of the separator will prevent the skim milk from being poured. A rocking of the bottle about its longitudinal axis will swing the slot 22 toward a vertical position and this will permit air to enter the skim milk compartment to relieve the vacuum, and allow the skim milk to pass through the slot 22 and out from the bottle.

The partition in the container or bottle may be raised or lowered to change the richness of the cream which is to be delivered. When the partition is used in a carton, it will reinforce the carton to permit larger cartons to be made and hold a greater quantity of whole milk. The two partitions 5 and 6 could be formed from the same blank that makes the carton. For example, side 16 could be extended and the extended portion folded back on itself and then the end bent at right angles to form the partition 6. In like manner the side 9 could have an extended portion bent back on itself and the end bent at right angles to form the partition 5. The top 4 could then be secured in place.

Where two separate partitions 5 and 6 are used, the edges 8 and 10 may overlap each other about an eighth of an inch. In other words, the partition 5 may extend toward the interior of the container a greater distance than illustrated. When the edge 8 overlaps the edge 10 to a slight extent, the pouring angle with respect to either the transverse or longitudinal axis of the container may be increased beyond the horizontal position shown and the vacuum will still hold the skim milk in place.

In the cream separator B it is possible to have two partitions like the partitions 5 and 6, one of the partitions being flush with one side of the flanges 17 and the other being flush with the other side. The width of the flanges 17 determines the distance between the partitions. The free edges of the partitions may overlap each other slightly if desired. The same change can be made in the cream separators D and E where partial partitions may be placed on opposite sides of the circular flanges 21.

I claim:

1. An article of manufacture comprising a partition member having an edge flange adapted to frictionally engage the inner wall of a container, said partition member being provided with a transversely extending elongated opening, the edges defining said opening being respectively curved in opposite directions above and below the general plane of the partition member and lying in substantially a common plane extending substantially perpendicularly to the plane of the partition member.

2. An article of manufacture comprising a partition member having an upstanding flange around the peripheral edge thereof, said flange adapted to frictionally engage the inner wall of a container, said partition member being provided with a transverse opening extending substantially across the full width of the partition member, the edges defining said opening being respectively disposed above and below the general plane of the partition member and lying in a substantially common plane extending substantially perpendicularly to the plane of the partition member.

3. An article of manufacture comprising a circular partition member with a circular flange adapted to engage frictionally with the inner wall of a container, said partition member being provided with an opening extending diametrically of the partition member for substantially the full width thereof, the edges defining said opening being respectively curved in opposite directions above and below the general plane of the partition member and lying in substantially a common plane passing through the longitudinal axis of the circular flange.

4. The combination with a transparent glass milk bottle having a neck portion, of vacuum producing partition means removably disposed in the bottle at the cream line for dividing the upper cream compartment from the lower milk compartment, said partition means having means defining an elongated opening, the edges of said opening being spaced longitudinally of the bottle and lying in a plane which parallels the longitudinal axis of the container, the longer axis of the opening extending at right angles to the container axis, said bottle when tipped about the longer opening axis while maintaining the axis horizontal causing a vacuum to be formed in the lower compartment for trapping the liquid contained therein and only permitting the liquid in the upper compartment to be dispensed, and a mark on the partition means and viewable through the glass bottle for indicating how to maintain the longer axis opening in a horizontal plane for pouring.

5. An article of manufacture comprising a disc with a circular flange extending from one side of the disc, said disc having a diametrically extending slot, said slot extending substantially across the full width of the disc, one edge of the slot being curved to extend into the space enclosed by the flange, the other edge of the slot being curved in the opposite direction, the curved edges lying in a plane substantially parallel to the longitudinal axis of the circular flange, and a handle projecting from the flange rim and being positioned substantially midway between the ends of the slot.

6. A milk bottle having a partition spaced from the upper end by a distance such that the capacity of the portion of the bottle above the partition is about equal to the bulk of the cream contained in the whole milk with which the bottle is intended to be filled, said partition having a slot extending transversely of the partition and substantially throughout the extent thereof, the edges which define said slot lying in a plane at right angles to the plane of the partition, and a mark on the partition and viewable through the bottle for indicating how to tip the bottle so that the longitudinal axis of the slot will remain in a horizontal plane, whereby a vacuum is created in the bottle portion disposed below the partition for trapping the milk therein and only cream will be delivered from the bottle, the milk being deliverable when the bottle is rocked on its longitudinal axis while in pouring position to swing the slot toward a vertical position, thus breaking the vacuum in the bottom of the bottle and permitting air to displace the milk.

7. A milk bottle having a cream portion and a milk portion separated from each other by a slotted partition, said cream portion having a capacity to hold the cream contained in the milk with which the bottle is intended to be filled, the edges which define the slot lying in a plane extending substantially at right angles to the plane of the partition and permitting the cream to rise to the top, the edges of the slot if maintained in a substantially horizontal position during the tilting of the bottle for pouring, causing a vacuum to be created in the bottle portion disposed below the partition for trapping the milk and only permitting the cream which is above the partition to be poured, the milk being retained by the vacuum in back of the partition until the vacuum is broken by the bottle being rocked on its longitudinal axis for swinging the slot toward a vertical position and permitting air to enter in back of the partition, whereby milk will flow through the slot and out the bottle.

8. The combination with a milk bottle, of a separator adapted to pass through the mouth of the bottle and engage the bottle to form a wall for separating the cream from the milk, the separator comprising a partition with a slot therein, the edges defining said slot being spaced longitudinally of the bottle and lying in a plane extending substantially at right angles to the plane of the partition, a marker on the separator placed at a point to position the edge of the slot lying nearest the bottle top at the lower portion of the bottle during the tilting of the bottle for pouring purposes, said marker being viewable through the transparent bottle for indicating that the slot is maintained in a horizontal position during the pouring of the cream when the marker is held at the top of the bottle during the pouring operation, whereby the vacuum created in back of the partition will prevent the milk from being poured.

9. A container for milk comprising a cream portion and a skim milk portion, a partition in the container placed at the juncture of the cream and milk portions, the cream portion having a capacity about equal to the bulk of the cream contained in the whole milk with which the container is intended to be filled, said partition having a slot extending substantially across the width of the container, the slot being formed by one edge of the slot being bent closer to the container top than the other with the two spaced edges lying in a plane that is substantially parallel with the longitudinal axis of the container, said container when tilted in a horizontal pouring position with the slot facing upwardly causing a vacuum to be created in back of the partition to retain the skim milk while the cream is being poured, a rocking of the container about its longitudinal axis to swing the slot toward a vertical position during the pouring operation, relieving the vacuum and permitting the skim milk to be poured.

10. A separator for use with a milk bottle having a cream portion and a skim milk portion, said separator comprising a disc adapted to be passed through the mouth of the bottle and to engage with the inner wall of the bottle at the cream line, said disc having a slot that extends substantially across the width of the bottle, one edge of the slot being disposed closer to the bottle top than the other edge thereof, the two spaced edges lying in a plane that is substantially parallel with the longitudinal axis of the bottle, and a rigid handle rigidly fixed to the disc and of such length as to project beyond the mouth of the bottle when the separator is at the cream line, the handle being connected to the disc at a point substantially equidistant from the ends of the slot and substantially perpendicular to the plane of the disc, and on that side of the slot whose edge is more remote from the bottle top, whereby the maintaining of the handle at the top of the bottle during the tilting of the bottle for pouring will maintain the slot in a horizontal line and will dispose the first-mentioned slot edge at the bottom half of the bottle, thus a creation of a vacuum in the skim milk portion of the bottle will permit only the cream to be poured, a rocking of the bottle during any portion of the pouring operation, swinging the slot toward a vertical position and releasing the vacuum to permit skim milk to be poured from the bottle.

11. The combination with a liquid container for holding a liquid that will separate upon standing into two volumes of different densities, of vacuum producing partition means placed in the container at the point where the two volumes meet for dividing the container into an upper and a lower compartment, the container having an opening communicating with the upper compartment, said partition means having an elongated opening, the edges of said opening being spaced longitudinally of the axis of the container and lying in a plane which parallels the longitudinal axis of the container, the longer axis of the opening extending at right angles to the container axis, whereby a tipping of the container into pouring position about the longer axis of the opening as a pivot, will cause a vacuum to be formed in the lower compartment for preventing the liquid in this compartment from passing through the opening in the vacuum producing partition means into the upper compartment while the liquid in the upper compartment is dispensed through the container opening.

12. The combination with a rectangularly-shaped container having an opening in its top and near one side of the container, of a cream separator comprising a partition means extending transversely across the container and disposed the desired distance from the top to form an upper cream compartment and a lower milk compartment, said partition means including means defining an elongated opening, the edges of the opening lying in a plane which extends substantially parallel to the longitudinal axis of the container, said opening having its longer axis lying parallel with the said side of the container, whereby said container when swung into a substantially horizontal pouring position while maintaining the longer axis of the opening in a horizontal position will create a vacuum in the lower compartment to trap the liquid contained therein, thus permitting only the liquid in the upper compartment to be dispensed.

CLARENCE E. DEARDORFF.